March 15, 1966 J. M. BROUSSEAU ET AL 3,241,045
VOLTAGE REGULATOR WITH NON-LINEAR FEEDBACK COMPENSATION
Filed Aug. 2, 1962
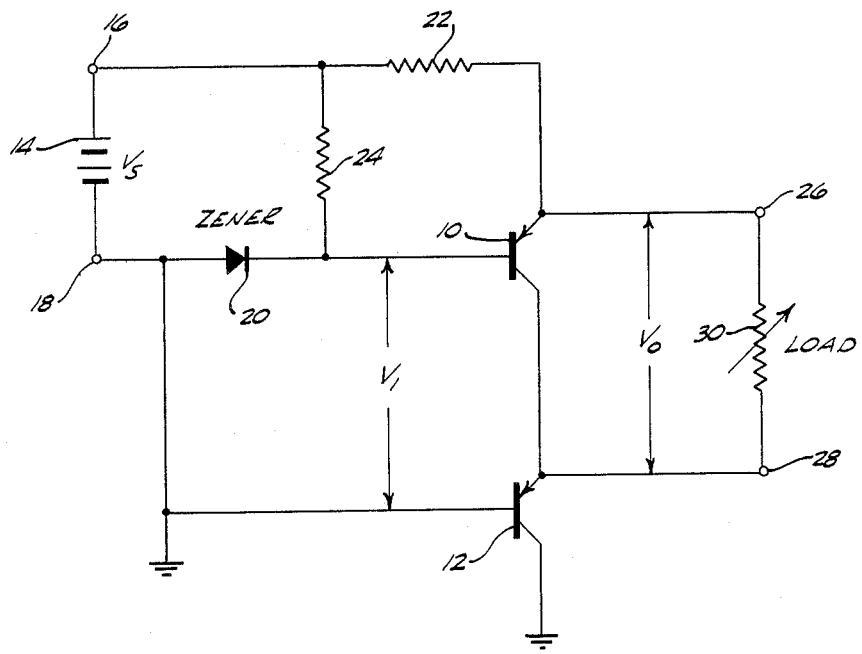
INVENTORS.
JOHN M. BROUSSEAU,
GEORGE R. TELLE,
BY
Paul M. Coble
ATTORNEY.

United States Patent Office 3,241,045
Patented Mar. 15, 1966

3,241,045
VOLTAGE REGULATOR WITH NON-LINEAR
FEEDBACK COMPENSATION
John M. Brousseau, North Hollywood, and George R.
Telle, Woodland Hills, Calif., assignors to Hughes Aircraft Company, Culver City, Calif., a corporation of
Delaware
Filed Aug. 2, 1962, Ser. No. 214,252
4 Claims. (Cl. 323—22)

The present invention relates to voltage regulator circuits, and more particularly relates to a regulator circuit utilizing a non-linear feedback compensation network to maintain a relatively low output impedance and to supply an essentially constant voltage to a variable load over a wide range of load current and ambient temperature.

In the prior art, voltage regulator circuits have been designed in which an appropriate value of linear resistance provides positive feedback to maintain a relatively low output impedance. Under optimum conditions the effect of the feedback loop is to reduce the output impedance of the regulator at one or two operating points.

Voltage regulator circuits usually employ non-linear devices such as vacuum tubes, transistors, and diodes; and therefore, the output impedance may tend to vary in a non-linear fashion with variations in load current. The feedback of the circuits discussed above is most effective in reducing the regulator output impedance at only one value of load current, and for other values of load current the feedback network loses its effectiveness. Moreover, transistorized voltage regulator circuits may be quite temperature sensitive on account of variations in the semiconductor characteristics with changes in ambient temperature.

Accordingly, it is an object of the present invention to provoide a voltage regulator circuit for supplying an essentially constant voltage to a variable load, and in which a low output impedance is maintained over wide variations in load conditions and ambient temperature.

It is a further object of the present invention to provide a transistorized voltage regulator circuit of relatively simple design which employs a feedback transistor to compensate for both voltage changes and temperature effects in the regulating transistor.

In accordance with the foregoing objects, the present invention provides a circuit including first and second amplifying devices with essentially the same characteristics and each having a first electrode, a second electrode, and a control electrode. An input voltage is applied between the first electrode and the control electrode of the first amplifying device. The second electrode of the first amplifying device is connected to the first electrode of the second amplifying device, while the second and control electrodes of the second amplifying device are connected to the input voltage source. The regulated output voltage is taken between the first electrodes of the respective first and second amplifying devices. Voltage and temperature effect changes in the first amplifying device are compensated for by like changes in the second amplifying device, thereby maintaining a substantially constant output voltage regardless of variations in load and temperature conditions.

Other and further objects, advantages and characteristic features of the present invention will become readily apparent from consideration of the following detailed description of a preferred embodiment of the invention when taken in conjunction with the appended drawing in which the sole figure is a schematic circuit diagram illustrating a voltage regulator according to the present invention.

Referring now to the sole figure, the voltage regulator circuit of the present invention is constructed around a regulating semiconductor signal translating device 10, illustrated as a PNP transistor, and a compensating feedback semiconductor device 12, such as a PNP transistor having the same characteristics as the transistor 10. The collector of transistor 10 is connected to the emitter of transistor 12, while the collector and base of transistor 12 are grounded. The input voltage $V_s$ is applied to the circuit from a source of potential illustrated as a battery 14 connected across the input terminals 16 and 18. The input terminal 16 is connected to the emitter of regulator transistor 10 through a biasing resistor 22 and is connected to the base of the transistor 10 via a biasing resistor 24. The other input terminal 18 is connected directly to the base of transistor 12 and is also connected to the base of transistor 10 through a zener diode 20. The regulated output voltage $V_o$ is developed between the respective emitters of transistors 10 and 12 and is applied to output terminals 26 and 28 connected across a variable load 30.

In the operation of the circuit of the present invention, it is desired to maintain an essentially constant voltage across the load 30 regardless of changes in load impedance and ambient temperature. Thus, during normal operation (i.e. steady state) current flows from the positive side of the source 14 through the parallel emitter-collector path of the transistor 10 and load 30, and through the transistor 12 to the negative side of the source 14. Also a small base current flows in the regulator transistor 10, with the zener diode 20 maintaining an essentially constant voltage $V_1$ at the base of transistor 10 regardless of changes in the emitter-collector current of the transistor 10.

In the event of an increase in the impedance of the load 30, the emitter-base voltage of regulator transistor 10 will increase, resulting in an increase in the emitter-collector current flowing through the transistor 10. Since the voltage $V_1$ at the base of transistor 10 is maintained constant by the zener diode 20, the increased emitter-base voltage of transistor 10 results in an increase in the voltage, as referenced to ground, at output terminal 26. The emitter-collector current of transistor 10 also flows essentially through the emitter-collector path of the compensating transistor 12, and the emitter-base voltage of transistor 12 will undergo an increase of essentially the same magnitude as that of transistor 10 on account of the similar characteristics of transistors 10 and 12. Thus, the voltage, as referenced to ground, at output terminal 28 will increase by essentially the same amount as the voltage at output terminal 26, and the output voltage $V_o$ across the load 30 will be maintained essentially constant. Decreases in load impedance will cause the circuit to operate in a similar but opposite manner, with essentially the same decrease in emitter-base voltage occurring for both of the transistors 10 and 12.

It will be apparent that by employing the compensating transistor 12 with the same emitter resistance characteristics as regulating transistor 10, a cancellation effect for output voltage components (hence a constant output voltage) is achieved over a wide range of load current variation. Moreover, since both transistors 10 and 12 have essentially the same temperature characteristics, changes in the characteristics of transistor 10 due to ambient temperature variations are substantially cancelled by similar changes in the characteristics of transistor 12.

Although the present invention has been shown and described with reference to a particular embodiment, nevertheless, various changes and modifications obvious to one skilled in the art are deemed to be within the purview of the invention. Thus, while the illustrated embodiment of the invention uses PNP transistors, other types of amplifying devices may be employed in the circuit. For example, NPN transistors may be used simply by reversing the polarity of the source 14 and the zener diode 20.

What is claimed is:

1. A voltage regulator circuit comprising: a source of input voltage having a first terminal and a second terminal, first and second amplifying devices each having a current path and a control electrode, said first and second amplifying devices having substantially the same impedance characteristics in their respective current paths, said current paths being connected in series between said first and second terminals and said control electrode of said second amplifying device being connected directly to said second terminal, means for maintaining a constant voltage between the control electrodes of said first and second amplifying devices, and a load connected directly across the current path of said first amplifying device.

2. A circuit for maintaining a substantially constant voltage across a load regardless of variations in load current and ambient temperature comprising: a source of potential having a first terminal and a second terminal, a regulating device having a current path and a control electrode, a feedback device having a current path and a control electrode, said current paths of said regulating device and said feedback device having substantially the same impedance characteristics and being connected in series between said first and second terminals, said control electrode of said feedback device being connected directly to said second terminal, means for maintaining a constant voltage between the control electrodes of said regulating device and said feedback device, and a load connected directly across the current path of said regulating device.

3. A voltage regulator circuit comprising: a source of potential having a first terminal and a second terminal, first and second transistors each having an emitter-collector path and a base electrode, said first and second transistors being of the same conductivity type and having substantially identical impedance characteristics, the emitter-collector paths of said first and second transistors being connected in series between said first and second terminals and the base electrode of said second transistor being connected directly to said second terminal, means for maintaining a constant voltage between the base electrodes of said first and second transistors, and a load connected directly across the emitter-collector path of said first transistor.

4. A circuit for maintaining a substantially constant voltage across a variable load regardless of variations in load current and ambient temperature comprising: first and second transistors of the same conductivity type and having substantially identical impedance characteristics, each transistor having an emitter, a base, and a collector electrode; the collector electrode of said first transistor being connected directly to the emitter electrode of the said second transistor; a source of potential having a first terminal and a second terminal; a first impedance element connected between said first terminal of said source and the emitter electrode of said first transistor; a second impedance element connected between said first terminal of said source and the base electrode of said first transistor; a zener diode connected between said second terminal of said source and the base electrode of said first transistor; the collector and base electrodes of said second transistor being connected directly to the said second terminal of said source; and a variable load connected directly between the emitter electrodes of said first and second transistors.

References Cited by the Examiner

UNITED STATES PATENTS 3,114,872  12/1963  Allard _____ 323—22

LLOYD McCOLLUM, *Primary Examiner.*

H. B. KATZ, D. L. RAE, *Assistant Examiners.*